June 4, 1968 W. H. PHILLIPS 3,386,686
STATION KEEPING OF A GRAVITY-GRADIENT STABILIZED SATELLITE
Filed Jan. 19, 1967

*INVENTOR*
WILLIAM H. PHILLIPS

BY

*ATTORNEYS*

3,386,686
STATION KEEPING OF A GRAVITY-GRADIENT
STABILIZED SATELLITE
William H. Phillips, Hampton, Va., assignor to the United States of America as represented by the Administrator of the National Aeronautics and Space Administration
Filed Jan. 19, 1967, Ser. No. 610,728
7 Claims. (Cl. 244—1)

ABSTRACT OF THE DISCLOSURE

A satellite having a lenticular body with a solar sail extending therefrom which supports a damping device that cooperates with proper inertia distribution to stabilize the satellite in pitch and roll. Proper mass distribution provides a preferred orientation in yaw such that the period of oscillation of the satellite in yaw is twice the orbital period. The yaw oscillations permit the forces due to radiation pressure from the sun to feed energy into the orbit on both half cycles. A current-carrying coil is located in the plane of the solar sail and interacts with the earth's magnetic field to produce torque about the Z-axis of the satellite and is controlled by ground command. Alteration of the current direction effects modification of the orientation period and thereby permits control of the energy fed into the orbit to permit station keeping.

---

The invention described herein was made by an employee of the United States Government and may be manufactured and used by or for the Government for governmental purposes without the payment of any royalties thereon or therefor.

This invention relates generally to satellites of the gravity-gradient stabilized type and more particularly to a method of station keeping for such satellites which utilize radiation pressure and the earth's magnetic field for proper location of the satellite.

Station keeping lenticular gravity-gradient stabilized satellites have utility as passive communications bodies. Various methods have been utilized for the station keeping aspects of such passive communication satellites. For example, it is known that the energy of the satellite orbit can be controlled by use of radiation pressure on the satellite. Satellites utilizing radiation pressure for control at times have apparatus for controlling the magnitude of the radiation pressure by turning the satellite with the aid of magnetic coils in order to expose surfaces of the satellite having different reflective characteristics to the sunlight. Such control systems are not desirable for lenticular satellites because excessive disturbing moments may be produced by radiation pressure and because the angular velocity used in turning the satellite may be sufficiently large to introduce undesirable gyroscopic moments. Furthermore, such control systems for spherical satellites, such, for example, as the spherical Echo type, require undesirable weight and complexity.

In view of the above disadvantages of the prior art, it is an object of this invention to provide a method of station keeping applicable to lenticular gravity-gradient stabilized satellites.

Another object of this invention is to provide a satellite utilizing suitable mass distribution to produce a yawing oscillation having a period equal to twice the orbital period in combination with a method of control by use of a magnetic coil to vary the natural oscillation period.

Still another object of the instant invention is to provide a simple and lightweight lenticular satellite having a solar panel extending therefrom in the plane of which is located a magnetic current-carrying coil and booms which support a damping device.

A still further object of this invention is to provide a satellite stabilized along two axes and controlled about the third, yaw, axis by proper inertia and mass distribution and a damping device to thereby permit control of the satellite by utilizing radiation pressure to provide energy for the orbit and accomplish station keeping of the satellite with respect to other satellites or locations in the orbit.

Generally, the foregoing and other objects are accomplished by utilizing a lenticular body housing a receiver and power source interconnected with a coil mounted in booms that extend from one side of the body and which support a damper and a planar solar sail.

A more complete appreciation of the invention and many of the attendant advantages thereof will be readily apparent as the same becomes better understood by reference to the following description when considered in connection with the accompanying drawings wherein.

Figure 1:
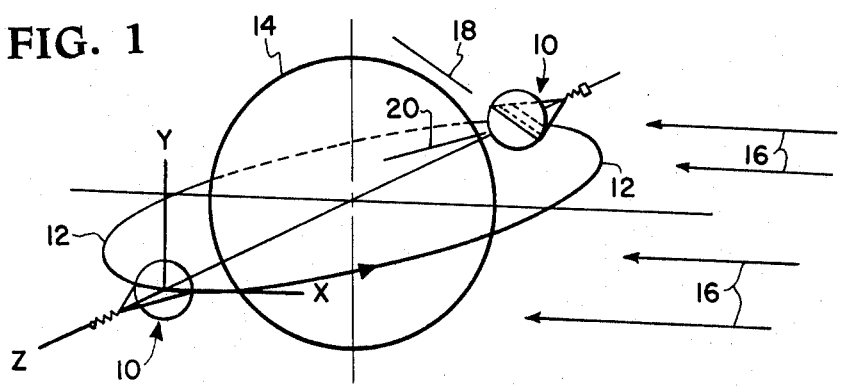
FIG. 1 is an isometric diagrammatic view of the orientation of the instant inventive satellite in orbit about the earth.

Referring now to the drawings and more particularly to FIG. 1 wherein lenticular gravity-gradient stabilized satellite 10 is shown schematically as being in orbit 12 about earth 14. In order to simplify description, rays 16 from the sun, not shown, are indicated as being in the plane of orbit 12. As will be described more fully hereinafter, satellite 10 oscillates about axis Z which would commonly be referred to as the yaw axis or an axis perpendicular to the earth. As satellite 10 orbits the earth it oscillates about the Z-axis such that in the first orbit the X-axis is along line 18 and in the next subsequent orbit the X-axis is aligned with line 20. Each alternative orbit of the earth by satellite 10 results in the X-axis, the roll axis, being aligned with line 18 with reference to the first orbit or line 20 with reference to the second orbit.

Figure 2:
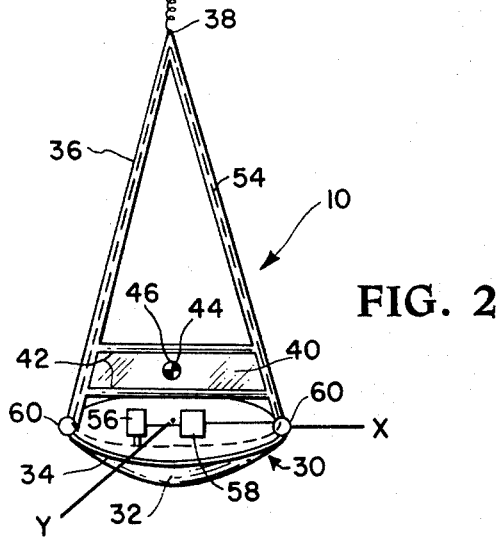
FIG. 2 is a diagrammatic sectional view of the novel satellite of the instant invention.

Referring now to FIG. 2 wherein satellite 10 is shown as having lenticular body 30 made of conventional materials, such for example as aluminum-coated Mylar. Lower surface 32 of body 30 is a segment of a sphere in order to provide effective reflection for utilization as a passive communications reflector. Body 30 utilizes inflatable tubular ribs 34 to rigidize the body once the satellite has been injected into its approximate orbit. As shown in FIG. 2 the overall satellite is related to X-, Y- and Z-axes which establish the respective roll, pitch and yaw axes of the vehicle.

Inflatable tubular booms 36 extend from the diametrically opposite edges of body 30 in the X—Z plane to meet at a point along the Z-axis and thereby provide a closed triangular configuration having apex 38. Solar sail 40 extends between tubular boom elements 36 and is supported by inflatable tubular members 42. As seen clearly in FIG. 2, solar sail 40 is aligned with the X-axis and has its center of area 44 coincident with center of gravity 46 of satellite 10.

Weight 50 is located along the Z-axis and is connected to apex 38 of boom elements 36 by damping spring 52. A current-carrying coil 54 is located within the inflatable boom members 36 and extends across lenticular body 30. Power source 56 is connected with coil 54 in a manner to permit current to flow in either direction in coil 54 by conventional means, not shown. Receiver 58 is also located within lenticular body 30 and is connected to activate power source 56 upon reception of the proper command signals from a ground source. Masses 60 are located in the X—Z plane to provide proper mass distribution to effect a preferred yaw orientation for the vehicle.

Figure 3:
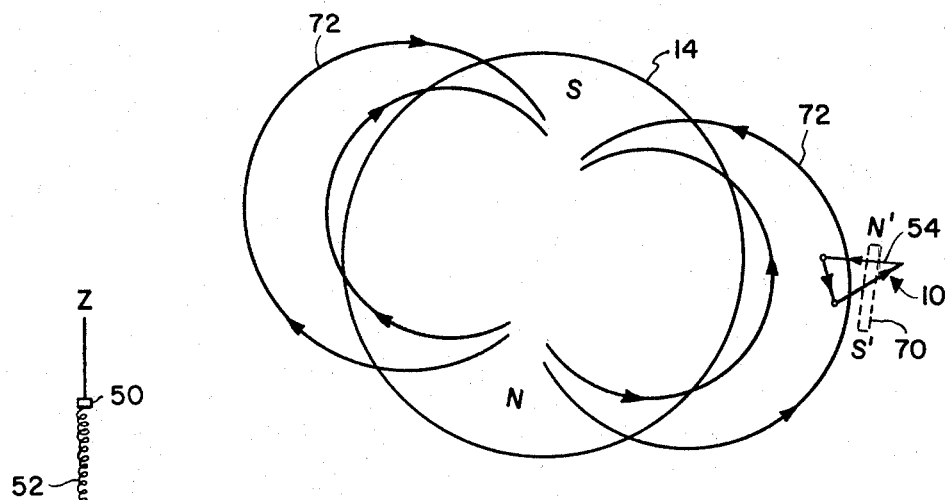
FIG. 3 is a schematic representation of the magnetic system utilized by the instant invention.

Referring now to FIG. 3 wherein earth 14 is shown diagrammatically to have magnetic lines 72 running from north pole N to south pole S. Current carrying coil 54, depending upon the direction of current flow, acts to become effectively bar magnet 70 having its respective north pole N' and south pole S'.

Satellite 30 is stabilized in pitch and roll by suitable inertia distribution and by damper 50–52. Such a system fails to provide stabilization or damping in yaw. Accordingly, the instant invention proposes to give the satellite a preferred orientation in yaw, that is the X-axis aligned with the plane of orbit 12 by suitable mass distribution, such for example, as masses 60. The mass distribution is adjusted to provide a period of oscillation of satellite 10 in yaw of twice the orbital period. Solar sail 40, of radiation-absorbing material, is mounted with center of area 44 at center of gravity 46 of satellite 10 and is aligned with the X-axis.

As illustrated in FIG. 1 sun lines 16 lie in the plane of orbit 12 to permit the acting forces to be visualized most easily. Solar sail 40 is aligned with sun's rays 16 as satellite 10 approaches the sun. As satellite 10 recedes, a rotation in yaw causes sail 40 to be deflected to its maximum amplitude and causes alignment of the X-axis with line 18. On the next half cycle, sail 40 is again aligned while approaching the sun, and is at the maximum amplitude in the opposite direction, that is, X-axis aligned with line 20, while receding. As a result, the force due to radiation pressure feeds energy into the orbit on both half cycles. If the oscillation in yaw of the satellite has the opposite phase relation such that sail 40 is aligned with the orbital plane while receding from the sun, energy will be removed from the orbit. Control of the phase of the oscillation can be obtained by slightly changing the period of yawing oscillation by allowing a current to flow in magnetic coil 54. The effect of this current in reacting with magnetic lines 72 is to increase or decrease the restoring moment in yaw to thereby change the period of oscillation. In this way, the phase of the oscillation is controlled.

The desired period of oscillation of the satellite in yaw, twice the orbital period, is obtained by suitable mass distribution. In order to obtain gravity-gradient stabilization, the moment of inertia about the Z-axis must be much smaller than the moments of inertia about the X and Y axes. The moment of inertia about the Y-axis must be slightly greater than about the X-axis in order to provide the desired oscillation period in yaw. These requirements are met with a practical distribution of mass in satellite 10 substantially as shown diagrammatically in FIG. 2.

The instant invention operates in a relatively simple manner in that once satellite 10 is injected into orbit 12, the predetermined inertia and mass distribution cooperate with damper 50–52 to properly orient satellite 10 to have spherical segment 32 on the bottom of lenticular body 30 directed toward the earth. This construction provides an automatic oscillation of satellite 10 about the Z-axis. In the event satellite 10 is improperly oriented or that yawing is out of phase with sun's lines 16, it is merely necessary for ground control to transmit a signal that is received by receiver 58 which activates power source 56 to cause current flow in magnetic coil 54. The flow of current in coil 54 reacts with magnetic lines 72 to vary the oscillatory or yawing motion and thereby change the period or time at which sail 40 is deflected at its maximum amplitude to sun's rays 16.

Continued application of the above procedure makes it possible to relate the oscillations of satellite 10 to the direction of rays 16 and thereby feed energy into orbit 12 due to radiation pressure encountering the radiation-absorbing material from which solar sail 40 is made. Thus, it is seen that by utilizing coil 54 to modify the frequency of oscillation about the Z-axis, satellite 10 is gradually brought into proper orientation with sun rays 16 to permit feeding energy into the orbit and thereby effect station keeping.

The above example would apply when satellite 10 has fallen behind or below its designated station. In the event that satellite 10 is moving ahead or above its station, it would be necessary to merely reverse the current in coil 54 and thereby vary the oscillation frequency of solar sail 40 and adjust the orientation of the sail to be aligned with sun rays 16 as satellite 10 recedes from the sun. Such action withdraws energy from orbit 12 and effects a slowdown or inward movement of satellite 10 to its designated station.

The proposed method of control which involved slightly changing the inherent dynamic characteristics of the vehicle rather than direct application of torque to produce an attitude change results in extremely small power consumption and weight for the magnetic coil. As compared to other possible systems for station keeping of gravity-gradient stabilized lenticular satellites, the instant invention has several advantages. For example, the configuration lends itself to keeping moments due to radiation pressure near zero to thereby avoid disturbing moments which would produce undesirable motions in pitch and roll. Angular velocities about the Z-axis are kept to a minimum to thereby avoid undesirable gyroscopic moments. The yawing oscillation period adjusts itself automatically with altitude since it is directly proportional to the orbit period. The mass distribution required is therefore the same at any altitude and does not need to change if the altitude is varied in station-keeping maneuvers. Control of satellite 10 from ground tracking stations is simplified because only one magnetic coil is involved. Accordingly, it is seen that the instant invention provides a simple and lightweight system for permitting station keeping of a gravity-gradient stabilized lenticular satellite.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United Stats is:

1. A gravity-gradient stabilized satellite comprising: body means, planar boom means extending from said body means; a solar sail supported by said boom means; damper means connected to said boom means at the free end thereof; current-carrying coil means disposed in said boom means; a power source connected with said coil means, whereby a small current in said coil means interacts with the earth's magnetic field to effect oscillation of the satellite to utilize radiation pressure on said solar sail to assist in proper stationing of the satellite.

2. The satellite of claim 1 wherein said body means is substantially lenticular having at least one surface forming a segment of a sphere; said boom means extending from said body means on the side opposite said one surface; and masses of material located in the plane of said boom means at the juncture thereof with said body means, whereby when the satellite orbits the earth said one surface is directed toward the earth and the satellite oscillates from a position in which said solar sail is directed to receive radiation pressure from the sun's rays to a position wherein said solar sail is alined with the sun's rays.

3. The satellite of claim 2 including receiver means disposed in said body means and connected with said power source, whereby on command from a remote location said receiver means activates said power source to cause current to flow in said coil means in a desired direction to interact with the earth's magnetic field and thereby vary the oscillatory period and effect station keeping of the satellite.

4. The satellite of claim 3 wherein said boom means is triangular having the apex thereof remote from said body means; said damper means comprising a damping spring having one end attached to said boom means at said apex; and a weight attached to the other end of said damper spring.

5. The satellite of claim 4 wherein said body means has X-, Y- and Z-axes, respectively the roll, pitch and yaw axes; and said boom means located to the plane of said X- and Z-axes.

6. A method of station keeping for gravity-gradient lenticular satellites comprising: distributing mass on the satellite such that the moment of inertia about the Z-axis is less than the moments of inertia about the X- and Y-axes with the moment of inertia about the Y-axis being slightly greater than the moment of inertia about the X-axis; putting the satellite in orbit with the Z-axis coincident with the yaw axis and the X-axis alined with the plane of the orbit; orienting the satellite and its solar sail to provide an oscillatory motion such that during a portion of the orbit the solar sail is alined wtih the sun's rays and during another portion of the orbit the solar sail is at an angle to the sun's rays to receive radiation pressure therefrom; varying the period of oscillatory motion of the satellite to effect station keeping thereof.

7. The method of station keeping of claim 6 wherein the step of varying the oscillatory period comprises: causing a current to flow through a coil on the satellite whereby the coil function as a magnet and reacts with the earth's magnetic field to cause the solar sail to have a greater area directed to radiation pressure during different portions of the orbit.

References Cited

UNITED STATES PATENTS

| | | | |
|---|---|---|---|
| 3,145,948 | 8/1964 | Kershner | 244—1 |
| 3,190,581 | 6/1965 | Wilson | 244—1 |
| 3,243,143 | 3/1966 | Dickstein et al. | 244—1 |

FERGUS S. MIDDLETON, *Primary Examiner*.